106-98 AU 113 EX
/9/79 OR 4,133,692

United States Patent [19] | [11] 4,133,692
Wright | [45] Jan. 9, 1979

[54] PROCESS FOR MANUFACTURING IMITATION STONE USED FOR DECORATION

[76] Inventor: Mitchell D. Wright, Fox Bay Rd., Loris, S.C. 29569

[21] Appl. No.: 817,781

[22] Filed: Jul. 21, 1977

[51] Int. Cl.[2] .......... C04B 7/02
[52] U.S. Cl. .......... 106/98
[58] Field of Search .......... 106/98

[56] References Cited

U.S. PATENT DOCUMENTS

| | | | |
|---|---|---|---|
| 3,068,109 | 12/1962 | Rodeffer | 106/98 |
| 3,117,882 | 1/1964 | Herschler et al. | 106/98 |
| 3,118,779 | 1/1964 | Leonard | 106/98 |
| 3,135,617 | 6/1964 | Newell et al. | 106/98 |
| 3,802,899 | 4/1974 | McConnaughay | 106/98 |

*Primary Examiner*—James Poer
*Attorney, Agent, or Firm*—George R. Douglas, Jr.; Sherman Levy; Anthony D. Cennamo

[57] ABSTRACT

A new, improved, and inexpensive method and mixture of cements for the manufacture of imitation stone used for the purpose of decorating the object or surface upon which it is applied for giving it the appearance of being made of real stone.

8 Claims, No Drawings

PROCESS FOR MANUFACTURING IMITATION STONE USED FOR DECORATION

The first step in my process is to obtain the necessary ingredients to prepare the stone mixture. There is a wide variety of ingredients that can be employed to obtain essentially the same end result. However, there are only four absolutely necessary ingredients, namely: (1) sand, (2) dry cement, (3) water, and (4) paint. An infinite number of chemicals, minerals or other materials can be employed, along with the aforementioned four ingredients, to obtain various chemical reactions, textures, strengths, colors, shapes and sizes. The time required for the stones to harden can be varied by the addition of catalysts or retarders, or any other time varying chemical which is compatable with the basic mixture. The texture and finished appearance of the stones can be varyed to suit the maker by the addition of rocks, stones, coquina, shells, cinders, or any other mineral or object that will give the maker the texture and finish he wishes. The color possibilities are endless, and can include the use of different colored sand of any type, the application of any type of paint or stain on the surface after the stones have dried or the introduction into the mixing process of any type of coloring agent that is compatable with the four basic ingredients. The sand used in my process can be of any available type of natural sand. However, the ideal type is the common builders type of sand used in the laying of brick. The cement used in my process can be any type or color of natural cement, such as portland cement, or any one of the different types of mortar mixes that are sold commercially under different brand names, or any type cement that will harden sufficiently when mixed with a quantity of water.

For the sake of brevity, I will limit the mixture for discussion, to the basic four ingredients of sand, portland cement, water and paint.

In making the initial mixture, I incorporate three of the four basic ingredients, namely sand, portland cement, and water. The ratio of sand to cement can range from one part cement to eight parts sand, to all cement and no sand. However, the ideal mixture for the best texture and hardness is one part cement to three parts sand. The amount of water added to the cement and sand mixture can vary from just enough water to dampen all the mixture, to sufficient water to give the mixture the consistency of cream. However, the ideal amount of water is enough to obtain a consistency comparable to that of mortar mix when used to lay bricks, yet slightly dryer so that the mixture will hold a shape when it is shaped by hand.

My process uses no molds to shape the stones, though they can be used if a particular shape is desirable by the maker. My process yields stones of random shape and size just as natural stones are. This is done by simply pouring the prepared mixture on any flat surface that the mixture will not adhere to. However, before pouring the mixture, the flat surface, which can be of any size according to what quantity of stones is desired, is first prepared by laying several cords or ropes across it. These cords can be of any size or composition that will allow the stones to be lifted from the flat surface. The cords should be laid out parallel to each other approximately six inches apart, and extend past the intended area where the mixture is to be poured far enough to allow access to them after the mix is poured. Furthermore, they should be attached firmly to the flat pouring surface at one end. Enough cords should be used to cover the entire width of the proposed pouring surface.

The mixture of one part cement, four parts sand, and a quantity of water is now agitated sufficiently to obtain a thorough mixing of the three ingredients. This mixture is then poured or otherwise placed on the flat surface covering the cords, as indicated, and then flattened into a solid sheet of any thickness desired by the maker. The ideal thickness is from one to three inches. Sufficient care is taken here to insure that the mixture is now in one solid sheet, covering all of the cords, yet leaving both ends exposed sufficiently to allow the maker to hold the cords firmly with his hands.

The solid sheet of stone mixture is now shaped into the desired texture, either by hands, or by using any type of mechanical device, or any other method, the object of which is to make the entire top surface of the mixture take on the rough appearance of natural stone textures.

The stone mix is now allowed to dry and begin to set up until a precise moment in the drying time is reached. In order to clearly exemplify when this precise time is reached, it is first necessary to fully explain the object of determining this time.

The solid sheet of mix is converted into stones of random shapes and sizes by simply pulling the loose ends of all the cords at the same time up and away from the solid sheet at an angle of approximately forty-five degrees. When the cords are pulled up and away at this angle, they attempt to lift the entire sheet of mix up from the flat surface. However, since the stone mix has not yet completely hardened, the result is the breaking up of the solid sheet into several smaller pieces. Therefore, the more drying time allowed, the harder the sheet will be, and the larger the resulting broken pieces will be. Conversely, the sooner the cords are pulled the smaller the pieces. These pieces will hereafter be referred to as stones.

The amount of drying time, or setting up time, is determined by either the introduction in the mixing stage of any type of compatable catalyst or retardant, or by the effect of the prevailing weather conditions. The ideal method is that of natural air drying on a warm day with low relative humidity. Under these conditions, a test should be made after approximately three hours of drying time has elapsed. This is done by slowly pulling on the cords in the indicated way until one or two stones break off. If the stones are of the desired size, they are then removed from the cords by gently lifting straight up. The cords have now performed a second function, by creating a groove in the back side of the stones. This groove will be filled with mortar mix when the stones are put on the surface to be decorated, thus giving additional adherance to the surface of the stones.

When the stones are removed from the pouring surface and from the cords, they are then ready to be smoothed over to attain their final appearance. This is accomplished by using water to wet the stone, followed by rubbing gently over the surface and edges with either one's hands, a sponge, a cloth, or any suitable device to get the desired effect. This is followed by a thorough rinsing of the stone to remove all the loose particles of sand and cement. The stones are then allowed to dry completely.

The stones can be colored by the addition of any type of cement colorant in the mixing stage, or by the use of paints or stains after they are smoothed and dried. For all practical purposes, the latter will yield the most flexible and realistic results, limited only by the ability of the maker. Any type of available paint, dye, stain or other compatable coloring pigments may be used.

When the coloring agent has dried, the stones are installed on the surface to be decorated by simply applying prepared mortar mix to the surface, applying mortar mix to the back side of the finished stone, and then pressing the stone to the surface. When the mortar mix dries, the stone will be bonded to the surface securely.

This composition, when manufactured as indicated, can be used on any solid surface that will hold the weight of the stones, and the mortar mix used when laid in the normal manner of laying such stones. It can be used indoors or outdoors to decorate the surface on which it is affixed, and give it the appearance of being made of real stone.

Having thus described my invention, what I claim and desire to secure by Letters Patent is:

1. Process of manufacture of imitation stone used for decorative purposes in construction comprising mixing cement, sand and water in amounts to form a mix to provide a consistency of mortar mix that will hold a shape when shaped, preparing a non-adhering surface by laying a plurality of cords across the surface in which the cords are of a size and composition that may allow the mix when at least partially hardened to be lifted from the surface for forming imitation stone pieces, pouring a sheet of mortar mix into a determined random configuration shape and size by simply pouring the prepared mix onto said non-adhering surface, said cords being substantially disposed in parallel relation, and having ends to allow access to the cords, allowing the mix partially to dry and to set for a predetermined time, pulling loose accessible ends of the cords generally upward and away from the sheet of mix at approximately 45° when the cords seem to attempt to lift the entire sheet of mix up from the surface and breaking up the sheet of mix into random sized pieces caused by the continued step of pulling said cords.

2. The process of claim 1 wherein said mix comprises one part of cement to eight parts of sand.

3. The process of claim 1 wherein said mix is one part cement to three parts of sand.

4. The process of claim 1 wherein paints are applied to a surface of the stone.

5. The process of claim 1 wherein one part cement and four parts sand comprise said mix.

6. The process of claim 1 wherein the sheet of mix extends from one to three inches in thickness.

7. The process of claim 1 with the predetermined time being approximately three hours and subsequently testing of the mix before break up of the mix into stone.

8. The process of claim 1 wherein water is added to wet the partially hardened mix prior to complete curing, the surface is rubbed to shape up a smooth surface, the hardened stone is rinsed to remove loose particles of sand and cement, and the resultant product is dried.

* * * * *